(No Model.)

R. GALLAND-MASON.
MICROPHOTOGRAPHIC ATTACHMENT FOR SPECTACLES.

No. 319,401. Patented June 2, 1885.

Witnesses.
John E. Parker
Harry Drury

Inventor.
Robert Galland-Mason
by his Attorneys
Howson and Sons

United States Patent Office.

ROBERT GALLAND-MASON, OF DOUGLAS, ISLE OF MAN, ENGLAND.

MICROPHOTOGRAPHIC ATTACHMENT FOR SPECTACLES.

SPECIFICATION forming part of Letters Patent No. 319,401, dated June 2, 1885.

Application filed October 28, 1884. (No model.) Patented in England January 8, 1884, No. 912; in France October 21, 1884, No. 164,911; in Belgium October 22, 1884, No. 66,664, and in Canada November 29, 1884, No. 20,668.

*To all whom it may concern:*

Be it known that I, ROBERT GALLAND-MASON, a subject of the Queen of Great Britain and Ireland, and a resident of Douglas, in the Isle of Man, England, have invented an Improved Optical Instrument, (for which I have obtained British Letters Patent No. 912, of January 8, 1884, French Patent No. 164,911, dated October 21, 1884; Belgian Patent No. 66,664, dated October 22, 1884, and Canadian Patent No. 20,668, dated November 29, 1884,) of which the following is a specification.

My invention consists of an improved optical instrument which I term a "microphotoscope" and which comprises essentially the combination, with the frame of a pair of spectacles or eyeglasses or an eyeglass, of a number of microphotographs arranged along said frame, and preferably along the upper part of the rim.

Figure 1:
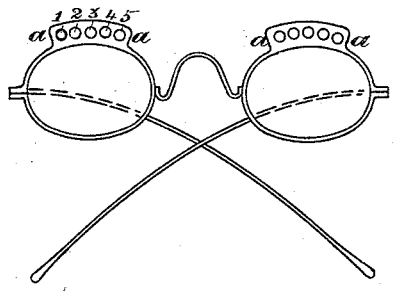
Figure 2:
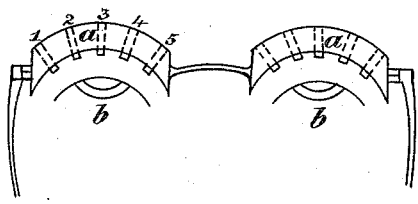

In the accompanying drawings, Figure 1 is a front view of a pair of spectacles embodying my improvement. Fig. 2 is a plan view of the same, illustrating the position of the eyes in relation thereto; and Fig. 3 is a front view of a modification.

As shown in Fig. 1, the microphotographs are arranged along the upper parts of the rims of the spectacles, as at $a$, and are fixed behind and attached to suitable microscopic lenses. Those parts of the rims in which these microphotographs are placed may be detachable or not, and may be bent round so as to be adapted to the convexity of the eyes $b$ of the wearer, as shown in the plan view, Fig. 2, in which the microphotographs are numbered 1 2 3 4 5. As the parts $a\,a$ containing the microphotographs are bent round and follow the curves of the eyes, and as the microphotographs 1 2 3 4 5 are so arranged in the rims as to radiate from about the centers of the eyes, the wearer of one of these instruments will be able, by simply moving his eyes, to look through any one of the microphotographs.

The microphotoscope may be worn in the same manner as ordinary spectacles or eyeglasses.

Figure 3:
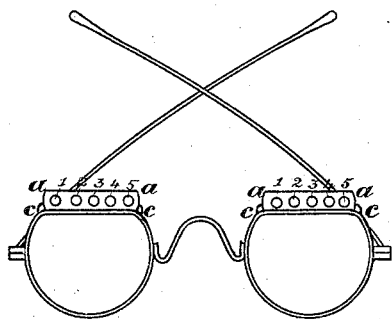

In the modification, Fig. 3, the portions $a$ of the rims of the spectacles which carry the microphotographs 1 2 3 4 5 are shown detachable, and are secured in position by small studs $e\,e$, which fit into suitable slots in the pieces $a\,a$. They may be made detachable and secured in any other convenient manner.

The microphotographs may be photographs of written or printed matter, maps, charts, landscapes, pictures, or any object or group of objects from which a photograph can be taken.

Some of the uses to which the microphotoscope could be applied are the following: For a student, the series of microphotographs in the rims of the spectacles might consist of copies of an epitomized grammar, history, geography, or any subject the student wishes to study. Thus the subject he was studying would be constantly before his eyes for reference in his spare moments without the trouble of carrying books about with him. The rims containing the microphotographs being detachable, he could at any time change the subjects. A lecturer might have the heads of his lectures photographed and placed in the rims of his spectacles; a lawyer his briefs; a clergyman his sermons; a bicyclist, tricyclist, or other tourist maps, views, and plans of the country through which he traveled; a shop-keeper a calendar, ready reckoner, &c.; a timber-merchant or builder cubes, measurements, and rules; travelers on the continent list of foreign terms, names of articles, foreign money-tables, and so on; a correspondent an abridged dictionary of technical or difficult words; a member of Parliament facts and figures relating to the subject of his speech; a doctor formulae; a public entertainer recitations, songs, "bon mots," &c.; a musician whole pieces of music; a detective criminals wanted.

It will be evident that the microphotoscope may be applied to a variety of other uses too numerous to mention.

It will be understood that the spectacle or eyeglass frames may have in them ordinary reading-glasses, when worn by those who need them, and when worn by those who do not they may have either plain glasses or no glass at all.

I claim as my invention—

1. The herein described new optical instrument, consisting of a spectacle or eyeglass frame provided with microphotographs, substantially as set forth.

2. The herein described new optical instrument, consisting of a spectacle or eyeglass frame having detachable portions carrying microphotographs, substantially as described.

In testimony whereof I have signed my name to this specification in the presence of two subscribing witnesses.

ROBERT GALLAND-MASON.

Witnesses:
GEORGE DAVIES,
CHARLES DAVIES.